(12) United States Patent
Curtis et al.

(10) Patent No.: US 8,972,447 B2
(45) Date of Patent: Mar. 3, 2015

(54) PERSISTENT OBJECT LINKAGE USING GHOSTING

(75) Inventors: John D. Curtis, Millbury, MA (US); Margo L. Ezekiel, Newton Centre, MA (US); Jonathan D. Champlin, Cold Spring, NY (US); Michael R. O'Brien, Westford, MA (US); Thomas M. Bentley, Chelmsford, MA (US)

(73) Assignee: International Business Machines Corporation, Armonk, NY (US)

( * ) Notice: Subject to any disclaimer, the term of this patent is extended or adjusted under 35 U.S.C. 154(b) by 1802 days.

(21) Appl. No.: 12/050,233

(22) Filed: Mar. 18, 2008

(65) Prior Publication Data

US 2009/0240725 A1    Sep. 24, 2009

(51) Int. Cl.
*G06F 7/00* (2006.01)
*G06F 17/30* (2006.01)
*G06F 9/44* (2006.01)

(52) U.S. Cl.
CPC ........................................ *G06F 8/71* (2013.01)
USPC .......................................... 707/778; 707/786

(58) Field of Classification Search
None
See application file for complete search history.

(56) References Cited

U.S. PATENT DOCUMENTS

| | | | | |
|---|---|---|---|---|
| 5,787,453 A | * | 7/1998 | Kennedy | 715/210 |
| 6,559,871 B1 | * | 5/2003 | Brozowski et al. | 715/853 |
| 6,608,628 B1 | * | 8/2003 | Ross et al. | 345/619 |
| 7,140,044 B2 | * | 11/2006 | Redlich et al. | 726/27 |
| 7,720,846 B1 | * | 5/2010 | Bayliss | 707/736 |
| 2004/0088335 A1 | * | 5/2004 | Xu et al. | 707/204 |
| 2005/0065994 A1 | * | 3/2005 | Creamer et al. | 709/202 |

OTHER PUBLICATIONS

Heinz Tschabitscher, "Purge Deleted Messages in Outlook", Apr. 4, 2006, About.com, Email Blog, pp. 1-3.*

* cited by examiner

*Primary Examiner* — Augustine K Obisesan
(74) *Attorney, Agent, or Firm* — BainwoodHuang (57) ABSTRACT

A system that persistently maintains and exposes one or more previous object hierarchies to which an object belonged across one or more hierarchy destroying operations, such as operations that delete parent objects, add parent objects subsequent to addition of their descendent objects, forward objects to or from the hierarchy, and/or modify hierarchy determining rules. A user interface object allows user access to one or more persistent hierarchies for the corresponding object. A hierarchy list or the like allows a user to select a desired one of the persistent hierarchies. A persistent hierarchy can be accessed in the disclosed system through a display object associated with any object within the hierarchy, including the root, leaves, and any intervening objects. When objects are deleted, "ghost" objects are maintained and displayed to the user in the hierarchical positions of the deleted objects when a persistent hierarchy is displayed.

18 Claims, 5 Drawing Sheets

PERSISTENT OBJECT LINKAGE USING GHOSTING

FIELD OF THE INVENTION

The disclosed system relates generally to relating and rendering of object sets hierarchically, and more specifically to a system and method for persistent object linkage using ghosting.

BACKGROUND OF THE INVENTION

As it is generally known, in the area of graphical user interfaces, hierarchical rendering of object sets is a ubiquitous means of automatically grouping objects, signifying ancestry (i.e. responses), nested taxonomic context, authorship, physical storage structure (e.g. directories), date/order of composition or arrival, markup language linkage, and other conceptual relationships between objects. Manual techniques also exist for creating and editing hierarchies of objects, where embedded or other automatic means of association are absent or insufficient.

Mouse operations used to manipulate hierarchically nested objects (e.g. drag and drop) are well-known, and are standardized across computer hardware, operating systems and software systems. When composition, revision and delete volatility is predictable, object hierarchies in existing systems are generally well-behaved and more or less static. However, problems arise from the use of the following object editing operations that can damage object hierarchies irreparably:

1. Deleting parent objects. Whether they are "founding objects" or intermediate nodes in the hierarchy, once objects are deleted from a hierarchy, the result is generally either a default rendering of a collapse, or breaking of a descendant tree.

2. Arrival or composition of ancestor objects after their descendants. For example, this problem may arise when a child electronic mail message arrives before a parent message, when a portion of a Web discussion forum is copied to another location, or when a Web page is moved from its original position in a Web site. Most semantic linkage implies an order of object inception, and is accordingly organizes objects from parent object (oldest) to child object (youngest). When a late arrival (e.g. via network latency) or composition (corpus addenda) occurs, object ancestry becomes confused at best. While there currently exist categorical techniques for reorganizing the affected objects, existing approaches all require human intervention.

3. Forwarding objects. Sending objects (e.g. messages) to other users is generally done out of any originating hierarchical context, even though a sending user may intend to forward an entire hierarchy, or cause it to be extended through the forwarding operation.

4. Modification of hierarchy rules. If a different categorization or means of grouping is performed on an object set, the prior hierarchy is discarded. There is generally no way to roll back such changes.

For the above reasons and others it would be desirable to have a new system that maintains static linkage structures across all types of object and/or metadata operations, as well as membership in an arbitrary number of hierarchies for any given object in a set of objects.

SUMMARY OF THE INVENTION

To address the above described and other shortcomings of previous systems, a new system is disclosed that persistently maintains and exposes one or more previous object hierarchies to which an object belongs. The persistent hierarchies are maintained across one or more hierarchy destroying operations, such as operations that delete parent objects, add parent objects subsequent to their descendent objects, forward objects to or from the hierarchy, and/or modify hierarchy determining rules. A user interface display object is provided that allows user access to one or more persistent hierarchies to which an object belongs. If multiple persistent hierarchies are maintained for an object, the disclosed system displays a list allowing a user to select a desired one of the persistent hierarchies to be displayed. A persistent hierarchy can be accessed in the disclosed system through a display object associated with any object in the persistent hierarchy, including the root, leaves, and/or any intervening objects. For example, persistent hierarchies or portions thereof that are made accessible to users by the disclosed system may be visually represented by display objects for the most recent or "latest" (e.g. most recently received or entered) object in the accessible persistent hierarchy or portion thereof, and/or by a "sub-root" object. In the present disclosure, a sub-root object is an object that is an intermediate node having multiple children, and that requires some type of special processing. Sub-root objects are sometimes known or referred to as "split ends".

In the case where objects within a hierarchy are removed (e.g. deleted, archived, etc.), "ghost" objects are maintained and displayed to the user in the hierarchical positions of the removed objects when the persistent hierarchy is displayed.

The persistent hierarchies maintained by the disclosed system may be associated with and/or accessed through any specific type of application that allows hierarchical display of objects. The persistent hierarchies of the disclosed system may be defined automatically and/or manually. Similarly, the hierarchy destroying operations that the persistent hierarchies are maintained through may be either automatically and/or manually generated.

In one embodiment, the disclosed system uses vectors of object identifiers stored as part of the objects, in order to persistently maintain hierarchical relationships. The vectors are automatically updated and corrected in response to operations performed on objects within the object store. Thread relations for all objects within the persistent hierarchies, including any objects that have been removed, are maintained as "tuples" in a separate repository from the objects themselves.

The persistent hierarchies of the disclosed system may be exposed through a variety of object rendering applications, providing efficient presentation of each object's membership and relative placement in multiple persistently maintained hierarchies.

Thus there is disclosed a new system that maintains static linkage structures across all types of object or metadata operations, as well as membership in an arbitrary number of hierarchies for any given object in a set of objects.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

Figure 1:
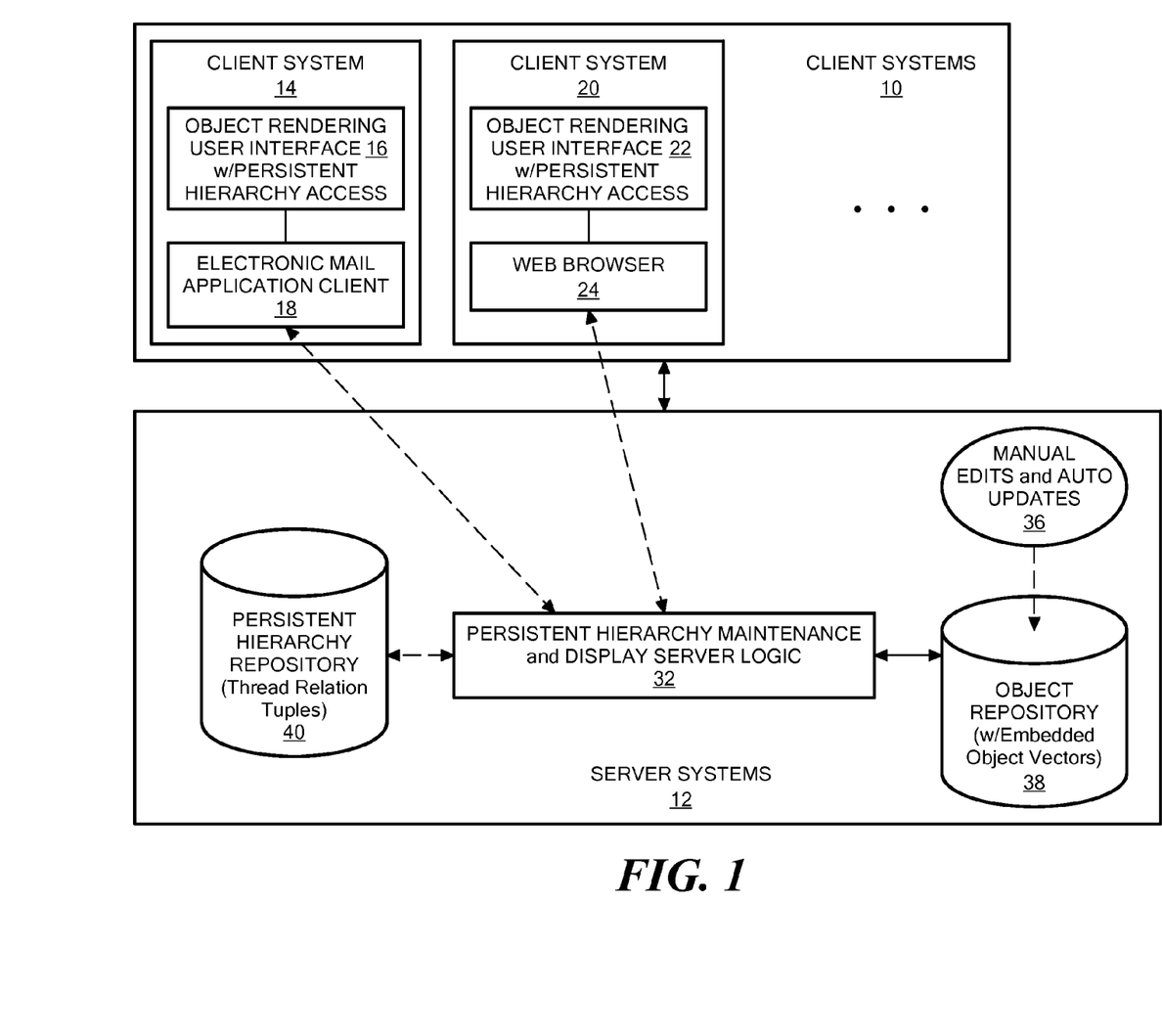
FIG. 1 is a block diagram showing components in an illustrative embodiment of the disclosed system.

As shown in FIG. 1, an illustrative embodiment of the disclosed system includes a number of Client Systems 10 and Server Systems 12. The Client Systems 10 include a Client System 14 and a Client System 20. Each of the Client Systems 10 is capable of generating a graphical user interface displaying one or more persistently maintained object hierarchies. The graphical user interfaces further include display objects that allow a local user to define or modify persistent hierarchies, and/or to select a persistent hierarchy for display.

The user interfaces of the disclosed system may be generated in whole or in part by any specific type of application. For example, the Client System 14 is shown including an Object Rendering User Interface 16 with Persistent Hierarchy Access as generated by an Electronic Mail Application Client 18, and the Client System 20 is shown including an Object Rendering User Interface 22 with Persistent Hierarchy Access generated by a Web Browser 24.

Server Systems 12 include an object repository, such as a document database or any other specific type of repository, shown for purposes of illustration by Object Repository 38. Objects stored in Object Repository 38 may include any specific type of object (e.g. files, documents, etc.), and may contain any specific type of data, such as text, graphics, program code, application data (e.g. electronic mail messages, Web content), and/or any other type of data.

The Server Systems 12 further include a separate persistent hierarchy repository, which may also be embodied as a database or the like, shown for purposes of illustration by the Persistent Hierarchy Repository 40. Persistent Hierarchy Maintenance and Display Server Logic 32 operates to maintain the persistent hierarchies stored in the Persistent Hierarchy Repository 40 even in the face of hierarchy destroying operations, as further described below. The persistent hierarchies maintained in the Persistent Hierarchy Repository 40 are originally defined by Manual Edits and/or Automatic Updates 36 that create or modify hierarchies of objects stored in the Object Repository 38. For example, and as further described below, the Persistent Hierarchy Maintenance and Display Server Logic 32 may be embodied to persistently maintain object hierarchies in the Persistent Hierarchy Repository 40 using vectors of unique object identifiers embedded in the Object Repository 38 and tuples representing object thread relations stored in the Persistent Hierarchy Repository 40.

The Client Systems 10 of FIG. 1 may be any specific type of computer systems and/or intelligent electronic devices, such as desktop, laptop, or palmtop computer systems, and/or personal digital assistant, cell phone, or other electronic devices. The Client Systems 10 each include or control display devices capable of displaying a graphical user interface (e.g. including Object Rendering User Interface 16 and Object Rendering User Interface 22) to a respective local user, such as a liquid crystal display (LCD), cathode ray tube (CRT), interferometric modulator display (IMOD), light emitting diode (LED), or the like.

Those skilled in the art will further recognize that the Electronic Mail Application Client 18, Web Browser 24, and/or Persistent Hierarchy Maintenance and Display Server Logic 32 of FIG. 1 may be embodied using software or firmware, such as computer application program code, operating system program code, or middleware, and/or wholly or partly using digital hardware components, such as application specific integrated circuits (ASICs), field-programmable gate arrays (FPGAs), and the like, and/or combinations of hardware and/or software or firmware.

Those skilled in the art will further recognize that the Client Systems 10 and Server Systems 12 of FIG. 1 may each include one or more processors, and program storage, such as memory, for storing program code executable on such processors, as well as input/output devices and/or interfaces. In the example of FIG. 1, the Client Systems 10 and Server Systems 12 are interconnected through a data communication network (e.g. the Internet, a Local Area Network, etc.) using one or more of such input/output devices or interfaces, and through which may further be provided communication to a number of other client systems and/or remote server systems.

While for purposes of concise illustration a limited number of client systems are shown in FIG. 1, the disclosed system is not limited to any specific number of client systems. Moreover, while certain functions are described as being performed in the Client Systems 10 and in the Server Systems 12, the disclosed system is not limited to any specific configuration or implementation in that regard. Accordingly, operations described as occurring in the Client Systems 10 may alternatively be performed in the Server Systems 12, and vice versa. In addition, while the illustrative embodiment of FIG. 1 is implemented in a client-server architecture, the disclosed system is not limited to such an embodiment, and may alternatively be embodied using any other specific type of system architecture that may be appropriate and/or advantageous for a given implementation.

Figure 2:
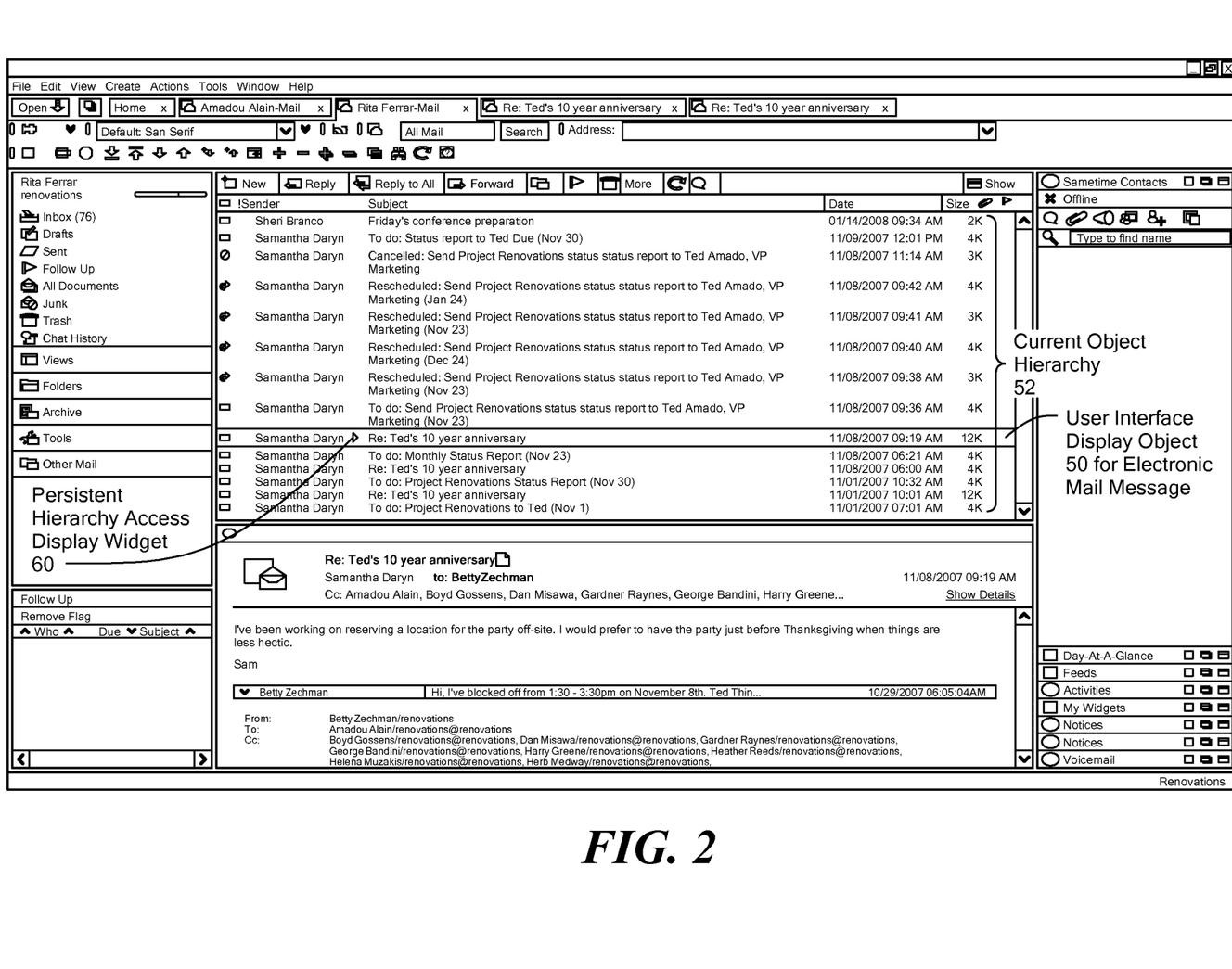
FIG. 2 is a first simplified screen shot showing a portion of a user interface including an object with an associated display object allowing a user to access one or more persistent hierarchies to which the object belongs.
Figure 3:
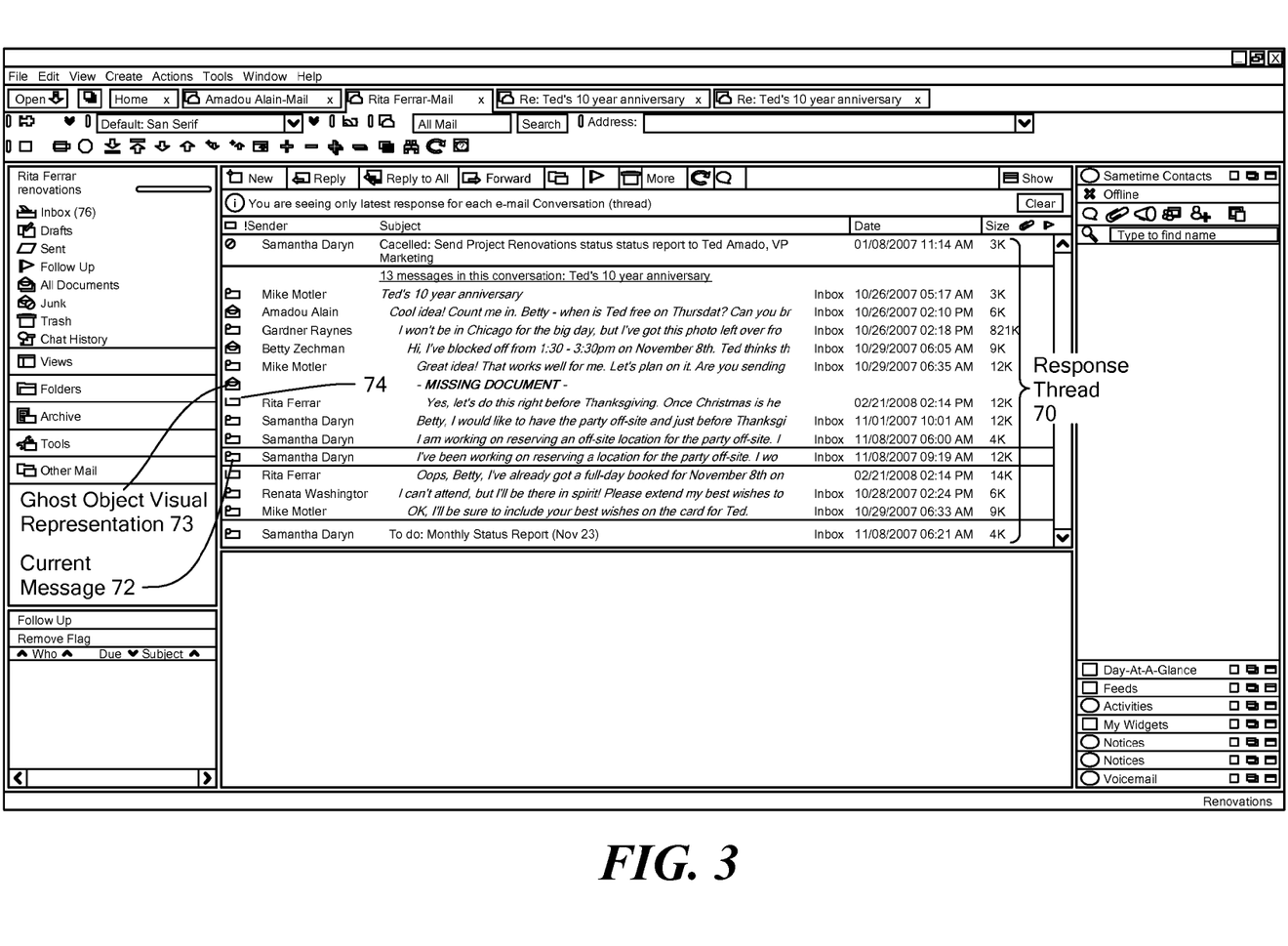
FIG. 3 is a second simplified screen shot showing a portion of a user interface including a persistent hierarchy of objects accessed through the object shown in FIG. 2.

FIG. 2 is a first simplified screen shot showing a portion of a user interface including a User Interface Display Object 50 for a corresponding electronic mail message. The User Interface Display Object 50 is displayed as part of a Current Object Hierarchy 52. For example, the Current Object Hierarchy 52 of FIG. 2 is shown as a list of display objects representing all of a user's received electronic mail messages, listed in order of receipt time within the user's electronic mail application Inbox. In another example, User Interface Display Object 50 may consist of or include a facial image of an employee within a Current Object Hierarchy 52 made up of facial images of employees organized by organization reporting hierarchy. In any event, the User Interface Display Object 50 includes a Persistent Hierarchy Access Display Widget 60 through which the user can access at least portions of a persistently maintained message hierarchy. The example Persistent Hierarchy Access Display Widget 60 shown in FIG. 2 includes a triangle-shaped object and text ("Re: Ted's 10 year anniversary") indicating that the corresponding electronic mail message is a response within a thread of response messages to an original message having the subject "Ted's 10 year anniversary." The hierarchical relationship of messages within the response thread associated with the Persistent Hierarchy Access Display Widget 60 is an example of at least a part of a message hierarchy persistently maintained by the disclosed system. When the user clicks on the Persistent Hierarchy Access Display Widget 60, the disclosed system operates to retrieve the response thread from the persistent hierarchy, and display it to the user as the Response Thread 70. As shown in FIG. 3, the electronic mail message object corresponding to User Interface Object 50 is displayed as Current Message 72 within the Response Thread 70. In this way the user can conveniently select the persistent hierarchy to be displayed, and the display of the selected persistent hierarchy allows the user to easily locate the original object through which the persistent hierarchy was accessed within the displayed portion of the persistent hierarchy. In the embodiment of FIG. 3, each entry in the Response Thread 70 indicates the sender of the corresponding message, includes a first part of the body of the corresponding message, indicates whether the corresponding message is in the user's Inbox, and shows the date, time and size of the corresponding message. However, the disclosed system is not limited to any specific format in this regard, and selected persistent hierarchies may be alternatively be displayed using any specific format.

The Response Thread 70 of FIG. 3 further includes Ghost Object Visual Representation 73, which is an example of a visual representation of a ghost object maintained by the disclosed system. In the example of FIG. 3, a document representation 74 corresponds to a response to the ghost document corresponding to the Ghost Object Visual Representation 73. The document representation 74 is an example of a visual representation of a child or descendant object of the ghost object corresponding to the Ghost Object Visual Representation 73.

As further described below, the Ghost Object Visual Representation 73 corresponds to a ghost object maintained by the disclosed system at the same hierarchical position within the Response Thread 70 as a document that is missing from the Response Thread 70 (e.g. has been moved or deleted, has not yet arrived, has not yet been delivered, is not yet known, etc.). The specific visual format and text content of the Ghost Object Visual Representation 73 shown in FIG. 3 are provided solely for purposes of illustration, and any other specific visual representation and/or text content may be used in the alternative, as may be appropriate for a given application or embodiment.

In another alternative embodiment, ghost objects are not visually represented in user interface displays of the persistent hierarchies maintained by the disclosed system.

Object Identifiers

The disclosed system generates unique identifiers for objects in persistent hierarchies. Various specific techniques may be used to produce the unique object identifiers. For example, Greenwich Mean Time (GMT) and date, machine identifiers (such as MAC address), ordinal number assignment within a object repository, and/or values produced by such means as hashing object contents can each contribute to a unique identifier assigned to each object added to the Object Repository 38 of FIG. 1. The disclosed system may be embodied using object identifiers of various sizes, such as identifiers that are 20 bytes long in binary (i.e. 4×32 bit integers), or that are 40 bytes in character representation.

Object Identifier Vectors

Figure 4:
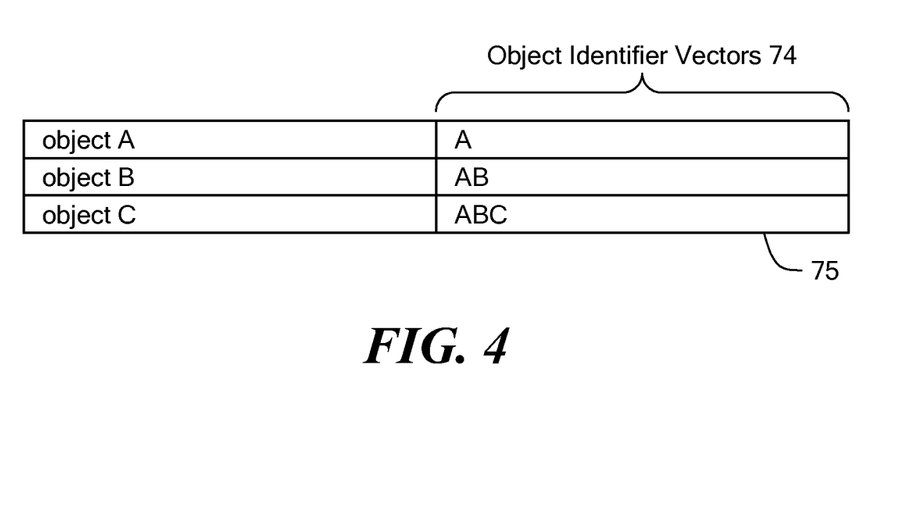
FIG. 4 shows a first example of the disclosed object identifier vectors in an illustrative embodiment.

In one embodiment, the disclosed system operates by constructing vectors of successive object identifiers. Using the object identifiers vectors, the hierarchical relationship between any two or more objects in a hierarchy (e.g. tree) can be represented. For example, if an object C is descended from an object B, which is in turn descended from an object A, the disclosed system operates to construct the Object Identifier Vectors 74 shown in FIG. 4. If an object's identifier vector has a single entry that is its own identifier (e.g. vector 75 for object A in FIG. 4), then that object is the founding object (or "root") of the hierarchy.

Figure 5:
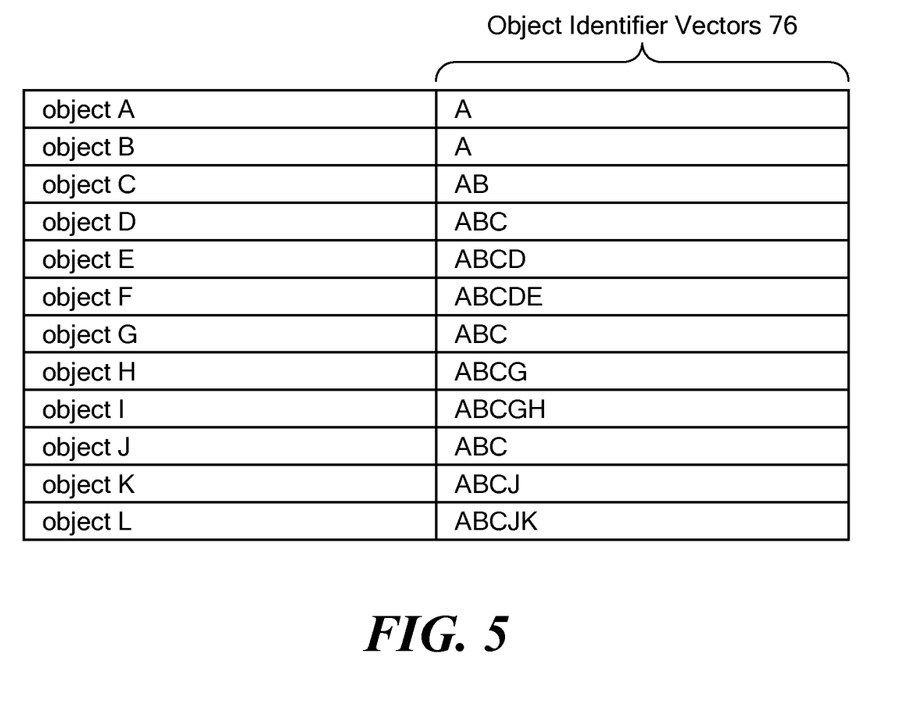
FIG. 5 shows a second example of the disclosed object identifier vectors in an illustrative embodiment.
Figure 6:
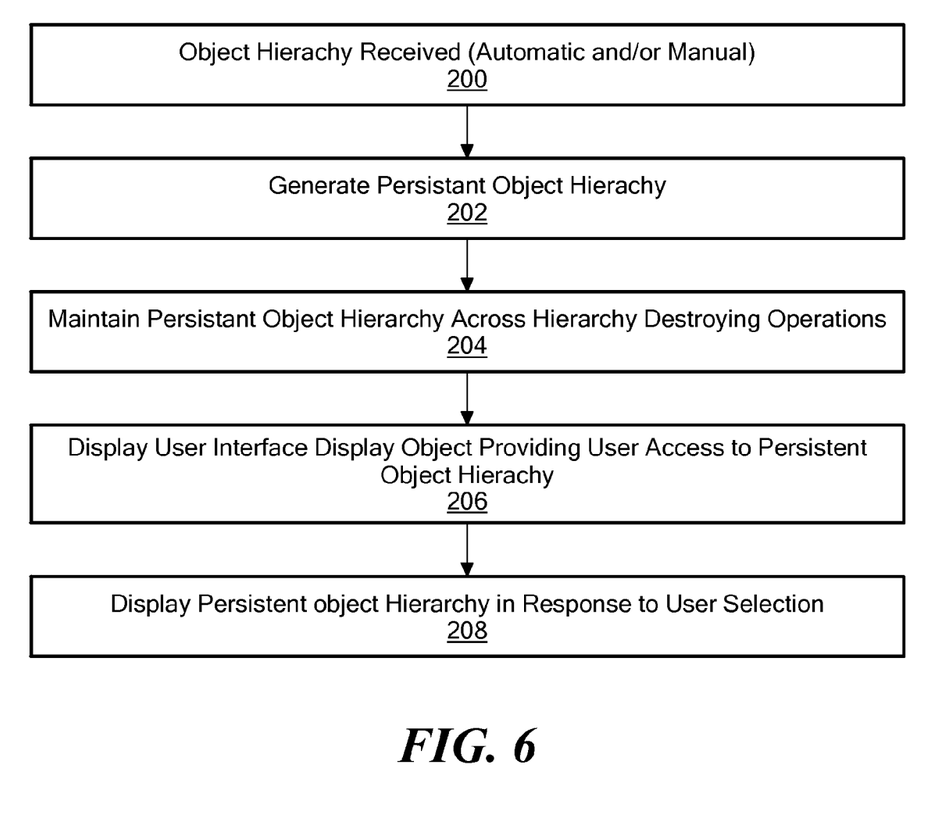
FIG. 6 is a flow chart showing steps performed during operation of an illustrative embodiment of the disclosed system.

If, for example, in the case where object C has three descendant objects (e.g. objects D, G and J), each of which has descendant objects to two more generations (e.g. D→E→F, G→H→I, and J→K→L), then the disclosed system operates to generate the set of Object Identifier Vectors 76 shown in FIG. 5.

In the disclosed system, object identifier vectors for persistent hierarchies are maintained across object hierarchy destroying operations, such as deleting of parent objects, arrival or composition of ancestor objects subsequent to their descendants, forwarding of objects from or into the hierarchy, and/or modification of rules defining a hierarchy. For example, in the event that objects D, H and J are deleted, placeholders ("ghost objects") are maintained via the contents of the Object Identifier Vectors 76, i.e. in the vectors for the surviving descendants of those objects. This persistence of hierarchical relation is advantageous for a variety of reasons. The persistent hierarchies maintain user access to historical or differing semantical representations of an object set following hierarchy changes. For example, persistence across object removals allows for archiving of lesser read content to save resources without losing access to the previous hierarchical significance of the archived content.

Establishing Hierarchy

Object hierarchies may generally be established through automatic and/or manual (i.e. hierarchy editing) processes. Automatic hierarchy establishment may be accomplished in response to various specific operations, such as replying to an electronic mail message, or responding to objects in community object stores, as in topical on-line discussion forums. Alternatively, the persistent hierarchies of the disclosed system may provide static linkage between HTML (HyperText Markup Language) objects, as defined by HTML .href syntax, as may be determined via Web crawling techniques. In such an embodiment, hierarchical relationships between objects can be represented in either direction (up or down), so that objects linked to can be considered parents of objects that link to them, or parents linking to other objects can be considered parents of objects they link to. In these ways, object linkage can be navigated in either direction, and one-to-many relationships are visually modeled to allow for jumping to linked objects without the need to browse their textual bodies.

In view of the above, multiple persistent hierarchies may maintained with regard to a set of Web page objects. For example, multiple site maps for a Web site may be persistently maintained as multiple persistent hierarchies, and displayed to the user as needed. As a result, a given page of the Web site may provide user access to and be displayed within renderings of different user selectable persistent hierarchies.

Various other examples of multiple hierarchies may also be provided by the disclosed system. Multiple persistent hierarchies of employee images for employees in a business organization may be maintained and rendered. For example, one of the multiple persistent hierarchies could reflect reporting structure within the organization, another could reflect team membership, another could represent employees within categories of expertise, and yet another could represent employees within their respective geographic locations. As further described herein below, even in the event that an employee left the company, and accordingly were deleted or removed from object set, the disclosed system would maintain and display a "ghost" object or object(s) for the former employee at their previous hierarchical position(s) within the multiple persistent hierarchies, e.g. in a faded, gray-scale, or otherwise visually distinct manner.

The disclosed system may use manual hierarchy definition through a hierarchy editor that allows a user to move object representations to desired positions within the hierarchy. For example, in such an embodiment, object summaries (e.g. Title, Author, brief abstract) may be displayed as the result of an object search (e.g. a Web search or search of the local object repository), author selection, or another type object retrieval operation. Using drag and drop mouse operations, the user can then move the object summaries to become descendants of one another. Using such a hierarchy editor, any given object in the set can be positioned by the user to have any number of descendants, and the hierarchy can be defined to an arbitrary level of complexity.

Threads

For every hierarchy established, a stored record of object hierarchical groupings within that hierarchy is maintained for each object, and stored apart from the object itself (e.g. within the Persistent Hierarchy Repository 40 of FIG. 1). These grouping records are stored as "threads", and are named uniquely after their founding (or most original) parent objects in the persistent hierarchy. Accordingly, the thread shown in FIG. 5 (as well as the thread shown in FIG. 3) is referred to as the "A" thread.

The disclosed system maintains threads within persistent hierarchies using tuples defined by the following relational schema:

| UniqueIdentifier | Current |
| UniqueIdentifier | Parent |
| UniqueIdentifier | Descendant | where the presence of a Parent identifier that differs from Current signifies the presence of an object from which Current is descended. When Parent is the same as Current, it represents the founding object of the thread. The Descendant value provides a means for navigating the thread from parent to descendant. When the Descendant value equals Current, there are no descendants for the Current object. When an object has more than one descendant, a tuple is stored for each descendant object.

To locate all threads of persistent hierarchies in which a given object is a member, the disclosed system locates every tuple having a Current value matching that object's unique identifier. From those tuples, the threads can each be generated. In addition, the following shortcut relation (i.e. "ThreadID") is stored for each thread to which an object belongs, and is used to flatten the search for the name of each such thread:

| UniqueIdentifier | Current |
| UniqueIdentifier | Founder |

Ghosts

There are states of hierarchies that have vacancies within a known set of related objects. For example, such a hierarchy state may occur as the result of undelivered electronic mail messages, or when electronic mail messages are delivered out of chronological sequence. In such a case, entire sets of responses can be generated before founding objects arrive in the object store. Another example of a hierarchy state including vacancies occurs when placeholders are created in manually edited hierarchies, e.g. when a human editor knows that object(s) exist in a sequence, but does not yet know the sequence. Yet another example occurs as the result of deletion or archiving of one or more objects from an object store. Such situations may arise for any particular type of object store or repository, and even when the object store is the Internet.

In each of the above cases, a representation of the missing object is necessary to persistently maintain a known state of an object hierarchy. For purposes of explanation, the representation (i.e. the object identifier) for a missing object is referred to herein as a "ghost" object, denoting the absence of any "real" object behind the identifier. Accordingly, if all objects other than F, I and L are absent from the persistent hierarchy shown in FIG. 5, (i.e. have been deleted or archived, have not yet arrived, etc.), all object identifiers other than F, I, and L are ghost objects. But because the disclosed system maintains ghost objects for those missing objects, the entire persistent hierarchy of FIG. 5 can be represented and rendered given only the object identifier vectors for the objects F, I and L. The use of ghost objects further advantageously enables a thread of objects to be properly labeled based on its true founding object, even if that founding object is absent from the object store.

In one embodiment of the disclosed system, object identifier vectors are constructed in response to the arrival of objects (e.g. into the Object Repository 38 of FIG. 1), or as the result of hierarchy editing operations, and incomplete states of the hierarchy are dynamically maintained. For example, if objects F, I and L each arrived with only a linkage to single parent object each (e.g. as in the case of HTML links), three separate threads (i.e. threads with ghosted founding objects E, H and K) would be maintained unless and until more parent objects arrived in the object store. If objects C, D and E subsequently arrived, each with a single parent linkage, then three threads would still exist, with the composition CDE, H and K. In this way, by continuously maintaining accurate object identifier vectors at any state of knowledge of a given hierarchy, the disclosed system allows hierarchical nodes to be joined to the greatest extent possible, and best case founding objects can be identified and their threads so named. Once accurate object identifier vectors have been built, the state of the object store is irrelevant to the hierarchical representation. That is, tuples describing thread membership for any object are never deleted by the disclosed system, unless editing is done to explicitly do so.

Rendering/Navigating Object Hierarchies

The disclosed system may be embodied to render summaries of objects by providing two techniques for viewing representations of the objects. The first technique renders summaries for all objects, where the summaries are sorted by some object attribute, such as date, title or author name. The second technique displays only a single object summary per thread in a collapsed state, and then utilizes indentation to represent an expanded object thread. When threads are represented in a collapsed state, the founding or other representative object may be rendered with an icon, such as '+' or a caret symbol, in order to visually indicate that more objects will be displayed if the thread is expanded. The determination of which object representation is displayed for a collapsed thread may be configurable and/or selectable. A given hierarchy can have its founding object, its most distant descendant (or latest) object, or any other object selected and used for display when the thread containing it is collapsed. In this way, a hierarchy can be visually identified using any scheme making the most sense to users of the hierarchy rendering interface.

The disclosed system further allows for multiple persistent hierarchies to be maintained for a given object. While only one hierarchy is in force during a given rendering of a thread of objects, any other hierarchy in which a document is a member can be switched to by clicking on an object's summary. In response to the mouse click, a list of threads and hierarchy names pertaining to an object is displayed, together with the count of objects in each of the different selectable threads. Then, in response to the user choosing a desired thread and hierarchy to be displayed (e.g. via a mouse over or the like), the object is rendered again within the desired hierarchy and thread context.

As described above, the disclosed system may be embodied to support various multiple persistent hierarchies of various specific types, including but not limited to multiple site maps for a Web site, multiple persistent hierarchies of employee images for employees in a business organization, etc.

The disclosed system may further be embodied to visually indicate that an object in a displayed persistent hierarchy is a ghost object, i.e. by displaying the ghosted object in a visually distinct way. For example, a ghost object may be displayed using grayed summary data, if such summary data is known, or using ellipses if such summary data is not known. The presence of such a visually distinct representation indicates that the object is a ghost object, and cannot be browsed or otherwise examined, and that a placeholder exists to maintain its position in a persistent hierarchy. Such historical or logical artifacts can carry various semantic significance as may be needed.

While the above description regarding illustrative embodiments of the disclosed system includes examples of specific user interface operations and/or display objects, the disclosed system is not limited to these specific embodiments. Accordingly, the user interface objects provided herein may be modified as appropriate for various alternative embodiments, using various specific configurations of graphical buttons, menus, dialog boxes, and the like. Those skilled in the art will accordingly recognize that alternative embodiments may use any specific type or kind of user interface display object that may be appropriate to provide the specific operations described.

The disclosed system can take the form of an entirely software embodiment, an entirely hardware embodiment, or an embodiment containing both software and hardware elements. The figures include block diagram and flowchart illustrations of methods, apparatus(s) and computer program products according to an embodiment of the invention. It will be understood that each block in such figures, and combinations of these blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); and/or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

We claim:

1. A method for persistently maintaining and exposing previous object hierarchies, comprising:

maintaining a plurality of persistent object hierarchies to which said object belongs across one or more hierarchy destroying operations, wherein said persistent hierarchies are maintained in vectors of object identifiers stored together with corresponding objects in an object repository;

generating a user interface object that allows a user to select one of said persistent hierarchies; and responsive to said user selecting one of said persistent hierarchies, displaying said selected persistent hierarchy with said object as a currently selected object within said selected persistent hierarchy.

2. The method of claim 1, wherein said object is a latest object in said selected persistent hierarchy.

3. The method of claim 1, wherein said object is a root of said selected persistent hierarchy.

4. The method of claim 1, wherein said object is a sub-root of said selected persistent hierarchy.

5. The method of claim 1, wherein said object is a leaf of said selected persistent hierarchy.

6. The method of claim 1, wherein said object is a non-leaf, non-root node of said selected persistent hierarchy.

7. The method of claim 6, wherein said hierarchy destroying operations include deleting at least one object from said selected persistent hierarchy.

8. The method of claim 7, further comprising maintaining and displaying a ghost object in a hierarchical position of said at least one object deleted from said selected persistent hierarchy.

9. The method of claim 8, wherein said hierarchy destroying operations further include forwarding at least one object from said selected persistent hierarchy.

10. The method of claim 9, wherein said hierarchy destroying operations further include adding a parent object to said selected persistent hierarchy subsequent to adding of a descendent object of said parent object to said selected persistent hierarchy.

11. The method of claim 10, wherein said hierarchy destroying operations further include modifying at least one hierarchy determining rule of said selected persistent hierarchy.

12. The method of claim 11, wherein said selected persistent hierarchy is, at least in part, automatically defined.

13. The method of claim 12, wherein said selected persistent hierarchy is, at least in part, manually defined.

14. The method of claim 13, wherein objects within said selected persistent hierarchy are electronic mail messages and said selected persistent hierarchy is displayed through an electronic mail application.

15. The method of claim 13, wherein objects within said selected persistent hierarchy are Web pages and said selected persistent hierarchy is displayed through a Web browser.

16. The method of claim 1, wherein said persistent hierarchies are further maintained using tuples representing object thread relations stored in a persistent hierarchy repository.

17. A computer system including at least one processor and a computer readable memory having program code stored thereon for persistently maintaining and exposing previous object hierarchies, said program code comprising:
- program code for maintaining a plurality of persistent object hierarchies to which said object belongs across one or more hierarchy destroying operations, wherein said persistent hierarchies are maintained in vectors of object identifiers stored together with corresponding objects in an object repository;
- program code for generating a user interface object that allows a user to select one of said persistent hierarchies; and
- program code for, responsive to said user selecting one of said persistent hierarchies, displaying said selected persistent hierarchy with said object as a currently selected object within said selected persistent hierarchy.

18. A computer program product including a non-transitory computer readable medium, said computer readable medium having program code stored thereon for persistently maintaining and exposing previous object hierarchies, said program code comprising:
- program code for maintaining a plurality of persistent object hierarchies to which said object belongs across one or more hierarchy destroying operations, wherein said persistent hierarchies are maintained in vectors of object identifiers stored together with corresponding objects in an object repository;
- program code for generating a user interface object that allows a user to select one of said persistent hierarchies; and
- program code for, responsive to said user selecting one of said persistent hierarchies, displaying said selected persistent hierarchy with said object as a currently selected object within said selected persistent hierarchy.

* * * * *